E. R. DRAVER.
COMBINED TIRE CARRIER AND COVER.
APPLICATION FILED JULY 10, 1915.
1,186,757.   Patented June 13, 1916.
3 SHEETS—SHEET 1.
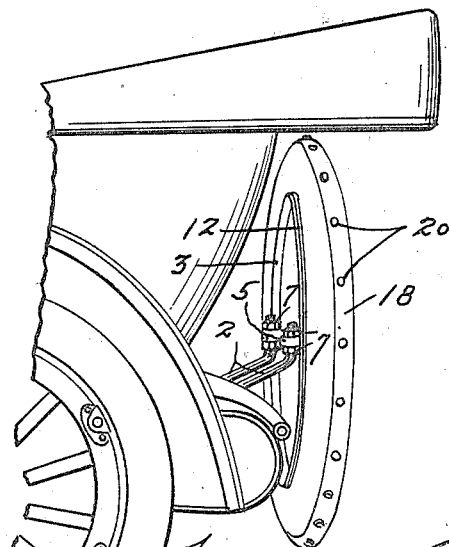
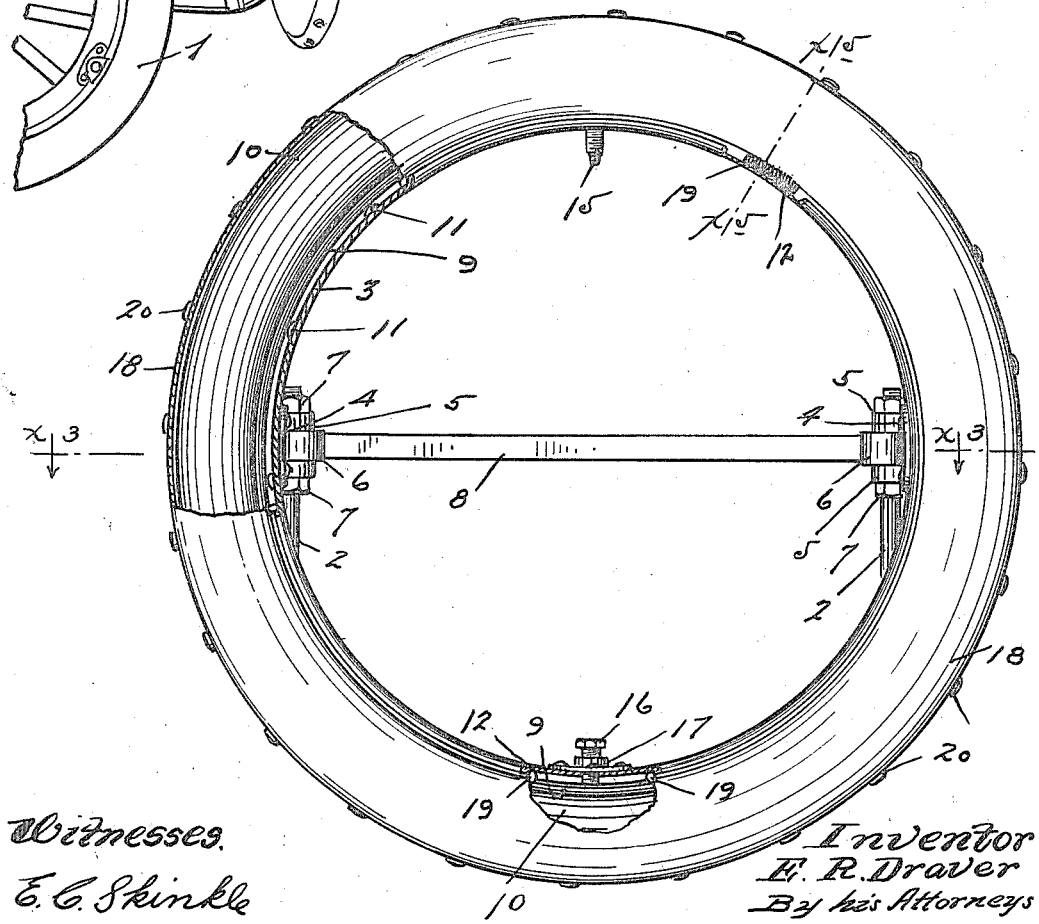
Witnesses.
E. C. Skinkle
H. D. Kilgore
Inventor
E. R. Draver
By his Attorneys
Williamson & Merchant E. R. DRAVER.
COMBINED TIRE CARRIER AND COVER.
APPLICATION FILED JULY 10, 1915.
1,186,757. Patented June 13, 1916.
3 SHEETS—SHEET 2.
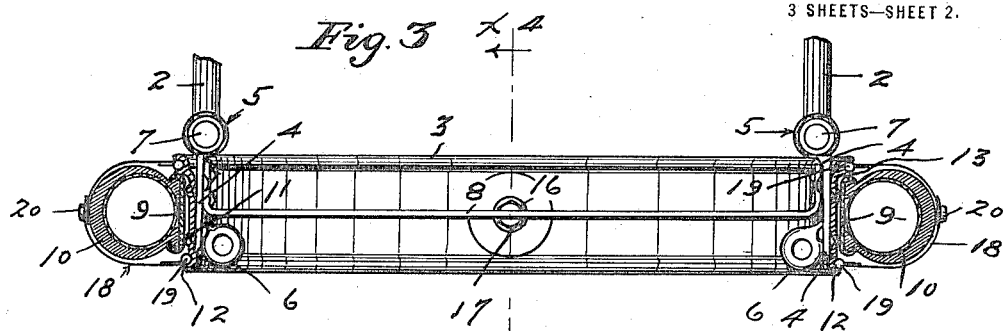
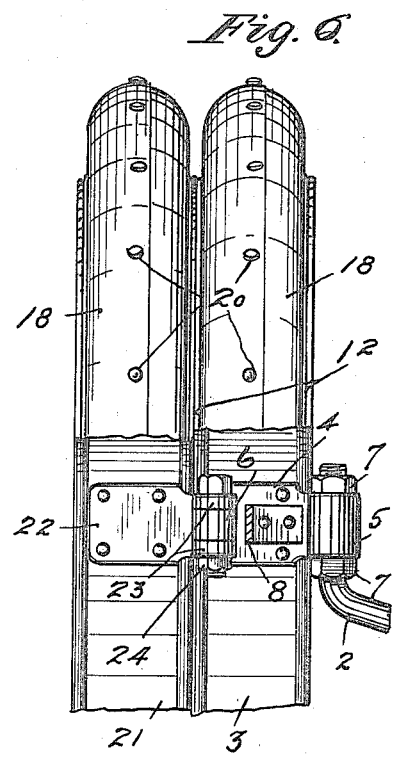
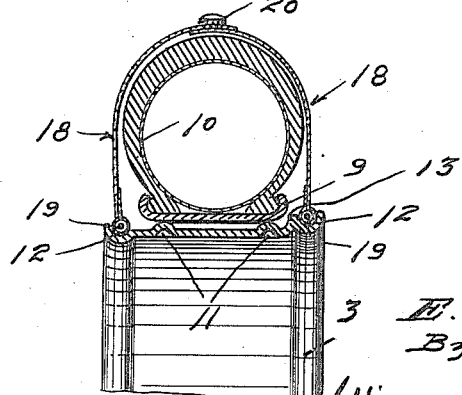

E. R. DRAVER.
COMBINED TIRE CARRIER AND COVER.
APPLICATION FILED JULY 10, 1915.

1,186,757.

Patented June 13, 1916.
3 SHEETS—SHEET 3.

Witnesses
E. C. Skinkle
H. D. Kilgore

Inventor
E. R. Draver
By his Attorneys
Williamson Merchant

UNITED STATES PATENT OFFICE.

EMIL R. DRAVER, OF RICHMOND, INDIANA.

COMBINED TIRE CARRIER AND COVER.

1,186,757.

Specification of Letters Patent.　　Patented June 13, 1916.

Application filed July 10, 1915.　Serial No. 39,145.

*To all whom it may concern:*

Be it known that I, EMIL R. DRAVER, a citizen of the United States, residing at Richmond, in the county of Wayne and State of Indiana, have invented certain new and useful Improvements in Combined Tire Carriers and Covers; and I do hereby declare the following to be a full, clear, and exact description of the invention, such as will enable others skilled in the art to which it appertains to make and use the same.

My invention has for its object to provide an extremely simple and highly efficient combined tire carrier and cover for use as an attachment for motor driven vehicles for carrying one or more extra tires equipped with demountable wheel rims.

To the above ends, generally stated, the invention consists of the novel devices and combinations of devices hereinafter described and defined in the claims.

In the accompanying drawings which illustrate the invention, like characters indicate like parts throughout the several views.

Figure 7:
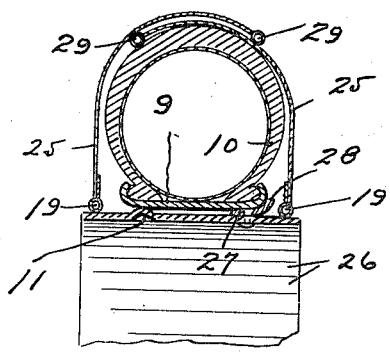
Figure 8:
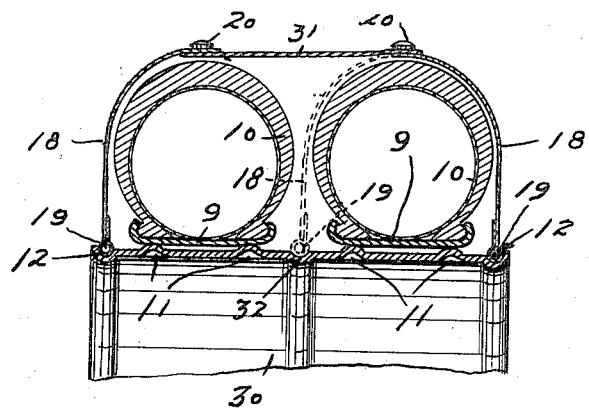
Figure 9:
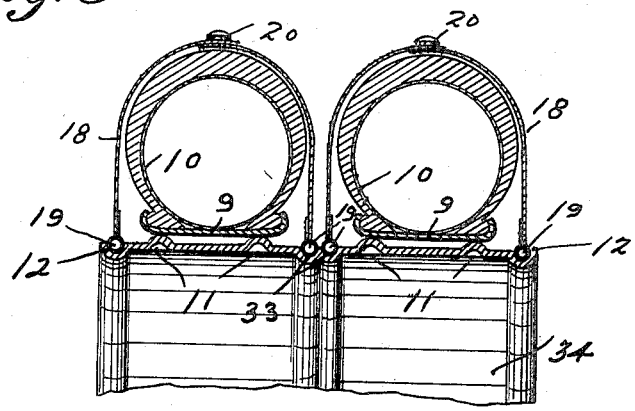

Referring to the drawings: Figure 1 is a fragmentary perspective view of an automobile having secured thereto, the improved tire carrier and cover; Fig. 2 is an outside elevation of the improved tire carrier and cover, some parts being broken away and some parts being shown in section; Fig. 3 is a horizontal section taken on the line $x^3$ $x^3$ on Fig. 2, on a reduced scale, some parts being broken away; Fig. 4 is a view partly in elevation and partly in vertical section taken on the line $x^4$ $x^4$ on Fig. 3; Fig. 5 is a view in transverse section taken on the line $x^5$ $x^5$ on Fig. 2 on an enlarged scale; Fig. 6 is a view partly in elevation and partly in vertical section with some parts broken away, showing two of the improved tire carriers and covers in coupled arrangement; Fig. 7 is a view corresponding to Fig. 5 but illustrating a slight modification; Fig. 8 shows the improved tire carrier designed for carrying two tires, and the cover designed to cover one or two tires under a single cover; and Fig. 9 is a view corresponding to Fig. 8, but illustrating a slight modification in covering of the tires.

Referring first to the construction, illustrated in Figs. 1 to 5, inclusive, the numeral 1 indicates, as an entirety, the rear end portion of an automobile to which the improved attachment, which is the subject matter of this invention, is secured. While the improved attachment is shown in the drawings as secured to, and projecting rearward from the frame of the automobile 1, it is, of course, understood that the same may be secured at any other desired place on the automobile.

The tire carrier comprises a pair of upwardly and outwardly projecting supporting arms 2 and a relatively wide carrying hoop 3. The supporting arms 2 are rigidly secured to the body of the automobile 1, and their outer or free ends are provided with screw threads. The carrying hoop 3 is secured to the supporting arms 2, in substantially a vertical position, by a pair of horizontally spaced diametrically opposite anchor plates 4. Each of these plates 4, has integrally formed therewith, a relatively large lug 5 and a relatively small lug 6. The lugs 5 and 6 of each pair are horizontally spaced transversely of the carrying hoop 3 and provided with vertical holes. The free ends of the supporting arms 2 are extended through the holes in the lugs 5 and rigidly secured in position thereon by opposing nuts 7 on the screw threaded ends of said arms. A horizontally extended brace bar 8 is rigidly secured, at its ends, to the anchor plates 4 for stiffening the carrying hoop 3. Obviously, this brace bar 8 will afford a convenient support for the license number of the automobile.

The extra demountable wheel rim 9 and attached pneumatic tire 10 are secured on the improved attachment by telescoping said rim onto the carrying hoop 3. On the outer face of the carrying hoop 3, are two rows of circumferentially spaced lugs 11, on which the demountable wheel rim 9, directly rests. These lugs 11 support the demountable wheel rim 9 from the carrying hoop 3 with sufficient clearance for the lock lugs, rivet heads, bolt heads, and the like, which project from the inner face of most demountable wheel rims. As shown, these lugs 11 are formed by pressing the body of the carrying hoop, outward.

Formed in each edge portion of the outer face of the carrying hoop 3 is a circumferentially extended groove 12. The edge portion of the carrying hoop 3, in which the inner groove 12 is formed, has a slightly increased diameter to afford a stop 13 which limits the telescopical movement of the demountable wheel rim 9 onto the carrying hoop 3. An aperture 14 is formed in the carrying hoop 3 at its highest point to receive the air valve 15 of the tire 10. A set screw 16 is shown, as one means, for clamping the demountable wheel rim 9 on the carrying hoop 3. This set screw 16 has screw-threaded engagement with a flanged nut block 17, rigidly secured to the inner face of the carrying hoop 3, at a point diametrically opposite the aperture 14 and the tire valve 15. The set screw 16 extends through the aperture in the carrying hoop 3 in position to impinge against the demountable wheel rim 9 and frictionally clamp the same in position on the carrying hoop 3.

The demountable wheel rim 9 and tire 10 are covered with an annular circumferentially divided cover 18 of suitable waterproof material. Hems are formed in the outer edges of the sections of this cover 18 to receive endless bands 19 for securing the outer edges of the said cover in the grooves 12. As shown, each of these clamping bands 18 is in the form of an endless coiled spring which yieldingly holds the hemmed edges of the cover 18 in the grooves 12. By springing these yielding bands sufficiently to clear the grooves 12, the cover 18 may be very quickly applied to, or removed from, the carrying hoop 3. It is, of course, understood that in place of these yielding clamping bands 19, bands of wire or other suitable means may be provided for securing the cover 18 to the carrying hoop 3. A plurality of circumferentially spaced separable fasteners 20 are provided for holding the inner edges of the sections of the cover 18, overlapped and closed. By opening these separable fasteners 20, the outer section of the cover 18 may be turned into position, to permit the demountable wheel rim 9 to be applied to or removed from the carrying hoop 3.

From the foregoing description, it is evident that the demountable wheel rim 9 and tire 10 are held completely incased by the carrying hoop 3 and cover 18, with no chance for said cover to become worn by the movement of the tire 10 and rim with respect to the supporting bracket. The tire covers, now commonly used, soon wear out at places where the tire engages the supporting bracket. After the tire cover becomes worn and full of holes, it is worse than no casing at all, for the reason that the mud, rain and dust collect therein.

Fig. 6 shows, in addition to the construction illustrated in Figs. 1 to 5 inclusive, means for detachably connecting a second carrying hoop 21 to the carrying hoop 3, in order to double the carrying capacity of the improved attachment. In this arrangement, the carrying hoop 21 has secured thereto, a pair of diametrically opposite anchor plates 22 having spaced lugs 23, adapted to embrace the lugs 6 of the anchor plates 4. The lugs 23 have holes adapted to be alined with the holes in the embraced lug 6 for receiving nut equipped bolts 24 for detachably connecting the two carrying hoops 3 and 21.

Referring now to the construction illustrated in Fig. 7, it will be noted that the circumferential grooves 12 are dispensed with, and the sections of the cover 25 are yieldingly clamped on the smooth face of the carrying hoop 26, by the yielding clamping bands 19. It will also be noted that there is only one row of lugs 11 and in place of the other row of said lugs, there is provided a band 27, curved upward at its outer edge, to afford a stop 28 which takes the place of the stop 13. The inner edges of the sections of the cover 25 are hemmed and have mounted therein, clamping hoops 29, formed from endless coiled springs which hold the lapped edges of the sections of the cover 25 closed. It will be noted that the lap of the sections of the cover 25 is considerable, in order to bring the clamping bands 29 well onto the sides of the tire 10, to permit free action of said bands in drawing the respective cover sections taut.

The construction shown in Fig. 8 is substantially the same as that shown in Figs. 1 to 5 inclusive, with the exception that the carrying hoop 30 is made of sufficient width to carry two demountable wheel rims 9 and tires 10 in axial alinement. The cover 18 is increased in transverse width in order to incase both rims and tires by inserting therein, an intermediate cover section 31. This cover section 31 has, at its longitudinal edges, the necessary members of separable fasteners 20 for coöperation with the members of the separable fasteners 20 on the sections of the cover 18. In case only one demountable wheel rim 9 and tire 10 is mounted on the carrying hoop 30, the cover section 31 may be detached and the outer section of the cover 18 shifted, as indicated by broken lines in Fig. 8. In this position of the outer section of the cover 18, its hemmed edge is secured in an intermediate circumferential groove 32, formed in the carrying hoop 30.

In Fig. 9, the construction is the same as that illustrated in Fig. 8 with the exception that two intermediate circumferential grooves 33 are formed in the carrying hoop 34 and an independent cover 18 is provided for each demountable wheel rim 9 and tire 10.

What I claim is:—

1. The combination with a carrying hoop and means for attaching the same to a vehicle, of a flexible tire cover applicable over said hoop and having flexible marginal clamping bands detachably anchoring the same onto the said carrying hoop.

2. The combination with a carrying hoop and means for attaching the same to a vehicle, of an engaged rim and tire telescoped over said hoop, and a flexible tire cover applicable over said tire and rim and having elastic marginal clamping bands detachably anchoring the same onto said carrying hoop.

3. The combination with a carrying hoop and means for attaching the same to a vehicle, of an engaged tire and rim telescoped over said hoop, and a flexible tire cover having at its edges elastic clamping bands detachably anchoring the same onto said hoop, said casing being circumferentially divided and overlapped and provided with means for detachably connecting its overlapped edges.

4. The combination with a carrying hoop and means for attaching the same to a vehicle, of an engaged rim and tire telescoped over said hoop, a flexible tire cover applicable over said tire and rim and having endless marginal elastic clamping bands detachably anchoring the same onto said carrying hoop, and which cover is circumferentially divided and overlapped, and provided at its overlapped edges with elastic clamping bands.

5. The combination with a carrying hoop having means for attaching the same to a vehicle, of a second carrying hoop, means for detachably anchoring the second hoop to the first noted hoop, whereby it is supported entirely therefrom, and tires independently telescoped over said carrying hoops and independently anchored thereto.

6. The combination with a carrying hoop, of a demountable rim telescoped over said carrying hoop with its upper portion resting on the upper portion thereof, said hoop, at a point remote from the contacting upper portion thereof with said rim, having an outwardly movable rim clamping device, and a tire cover attached to said hoop at points laterally offset from said rim clamping device.

7. The combination with a carrying hoop having a nipple passage at its transversely intermediate portion, of a demountable rim telescoped over said carrying hoop, a tire on said demountable rim having a charging nipple projecting therethrough and through the nipple passage of said hoop, said hoop at a point remote from said nipple passage having an outwardly movable rim clamping device coöperating with the said nipple to hold the said rim and tire locked to said hoop, and a tire cover attached to said hoop at points laterally offset from the said nipple passage and rim clamping device.

8. The combination with a carrying hoop over which a tire is adapted to be telescoped, of a flexible detachable cover applicable over said carrying hoop and having elastic marginal edges detachably anchoring the same to the said carrying hoop, said hoop, just outward of said elastic edges having outwardly projecting annular portions of greater diameter than the bottoms of the seats engaged by the said elastic marginal edges.

9. The combination with a carrying hoop over which a tire is adapted to be telescoped, of a flexible detachable cover applicable over said carrying hoop and having elastic marginal edges detachably anchoring the same to the said carrying hoop, said hoop, just outward of said elastic edges having outwardly projecting annular portions of greater diameter than the bottoms of the seats engaged by the said elastic marginal edges, and the said elastic marginal edges being formed with folds, and in the folds, having endless elastic clamping bands that materially increase the thickness thereof.

In testimony whereof I affix my signature in presence of two witnesses.

EMIL R. DRAVER.

Witnesses:
CLARENCE C. SHOFER,
CHAS. D. STOKES.